Feb. 26, 1935.  H. E. OTTING  1,992,836
MILK PRODUCT
Filed Dec. 14, 1931
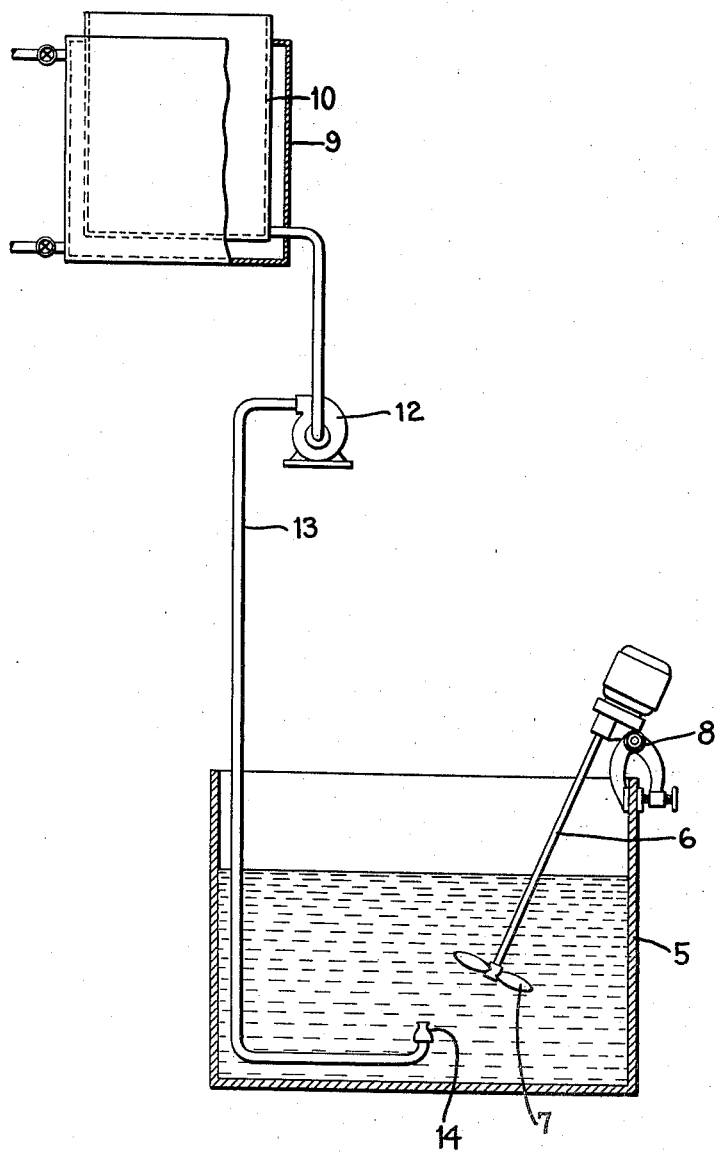
INVENTOR
*HERBERT E. OTTING*
BY
ATTORNEY Patented Feb. 26, 1935

1,992,836

UNITED STATES PATENT OFFICE 1,992,836

MILK PRODUCT

Herbert E. Otting, Westerville, Ohio, assignor to M. & R. Dietetic Laboratories, Inc., a corporation of Ohio Application December 14, 1931, Serial No. 580,977

8 Claims. (Cl. 99—11)

The present invention relates to a buttermilk-type product and to improvements in making the same and will be fully understood from the following description thereof, illustrated by the accompanying drawing, in which apparatus suitable for carrying the invention into effect is shown.

In the preparation of products of the buttermilk-type by the incorporation of butter fat into skim milk in which a desired proportion of acid has been secured by suitable bacterial action, it has hitherto been customary to introduce the butter fat, in the form of cream, into the cold, properly cultured skim milk or a part thereof, and churn or agitate the mixture in a churn until the characteristic granulation of the butter fat particles appears. The churning operation, to secure the desired result, requires a long period of time, often as much as two hours; and furthermore requires the use of expensive equipment not available in many small dairies. Furthermore, as produced by this process, the product is readily subject to separation or "wheying-off" and the tendency is particularly evident if attempts are made to transport the product after it has been made. The usual practice to at least partly overcome this difficulty has been to store the product in cold storage for a considerable period, say 24 hours or longer, before shipping or transporting it. This necessary practice, however, requires investment in containers and large storage facilities and greatly adds to the cost of production and distribution of the material.

I have found that the difficulties in preparing and handling such a product, and more particularly the necessity for the use of a churn or similar device and the tendency of the product to separate or "whey-off" may be obviated by effecting the dispersion of the butter fat in a suitably cultured skim milk under carefully controlled conditions. At the same time, by operating in accordance with the invention I am able to secure a product in which the fat particles are in a finely divided and particularly flaky form imparting a highly desirable rich and smooth character to the product.

In the accompanying drawing I have shown, in the single figure, somewhat diagrammatically and partly in section, apparatus suitable for carrying the invention into effect. In the drawing, the numeral 5 indicates a vat or container for the cultured skim milk into which the butter-fat is to be dispersed. Means are likewise provided for agitating the fluid in the container; for example, a portable agitator 6 having a propeller 7 immersed in the liquid and supported on the container, as by the clamp 8.

A container 9 is provided for butter-fat or a butter-fat containing liquid, such as cream. The container may be provided with a jacket 10 for steam, hot water or other heat-controlling medium. From the container 9 the butter-fat (melted) or other selected butter-fate containing material is withdrawn through pipe 11 by pump 12 and forced under pressure through pipe 13, which discharges below the surface of the liquid in container 5, terminating in a spray nozzle 14, by which the butter-fat or cream is finely atomized. As will be readily apparent, instead of using pump 12, any other suitable means for forcing the butter-fat material into the liquid in the container and atomizing it may be employed; for example, air or gas pressure on the surface of the butter-fat liquid in container 9, or an air or steam atomizer or ejector, or the like. During the dispersion of the butter-fat liquid in the cultured skim milk in container 5, the skim milk is agitated or circulated, for example, by means of the propeller 6. It will be understood, of course, that all parts of the apparatus used are of a material and construction to permit them to be readily sterilized.

In carrying out the invention the skim milk used, after pasteurizing, is inoculated with a suitable lactic acid-forming organism, such as *Streptococcus lactis*, *B. acidophilus* or *Lactobacillus bulgaricus*, and maintained at a temperature to secure the desired bacterial action. The temperature may suitably be about 70° F. if *Streptococcus lactis* is employed, or 98° F. in the case of *Lactobacillus* or *B. acidophilus*. After the desired development of lactic acid is secured, the cultured milk is cooled to a temperature not higher than about 75° F. and preferably about 50° F. The desired proportion of butter-fat material suitably to provide between 0.5% and 2.5% and generally about 1.5% butter-fat is then forced into the cool cultured skim milk through the spray nozzle 14 or similar atomizing device, the cultured skim milk being maintained by the propeller 6 in a condition of agitation or flow so that the atomized butter-fat is practically immediately carried away from the atomizer and dispersed through the mass. By maintaining the body of cultured skim milk in cooled condition and in a state of agitation, to rapidly disperse the butter-fat material throughout the mass, I secure a product in which the butter-fat is present in flaky, fine particles and a particularly smooth and rich flavor is imparted to it.

In carrying out the invention, skim milk is inoculated with a suitable bacteria after having been pasteurized and cooled to a proper temperature, not higher than that suitable for proper culture of the selected bacteria. It is then held at a temperature suitable for the selected bacteria until the desired acidity has been developed. In general, the acidity developed will vary from 0.5% to 1%, calculated as lactic acid. By using *Streptococcus lactis*, an acidity up to about 1.25% may be developed; but in general about 0.9% to 1% is secured. When using *Streptococcus lactis* as the acidity developing organism, the skim milk is cultured at a temperature of about 70° F. When using other lactic acid-producing organisms, such as *Lacto-bacillus bulgaricus* or the acidophilus organism, higher temperatures are required, suitably from 98° F. to 105° F.

Preferably after the development of the desired proportion of lactic acid and while the cultured skim milk is at a temperature not above 75° F. to 80° F. I introduce into it the desired small proportion of butter-fat, ranging from 0.5% to 2% and preferably from 1% to 1.5%, while maintaining the cultured skim milk in constant agitation or flow past the atomizing device by which the butter-fat is introduced. The butter-fat may be introduced in the form of substantially pure butter-fat, in which case the desired proportion of it is held in melted form in the container 9, being withdrawn from the latter and forced by the pump 12 through the line 13 and atomizing spray 14 into the body of cultured skim milk in container 5, the latter being caused to flow continuously past the atomizing device by means of agitator 6. In this manner an effective and uniform dispersion of the small proportion of butter-fat throughout the entire mass is secured without collection or agglomeration of the butter-fat particles in masses of substantial size. In place of substantially pure butter-fat, I may introduce into the cultured skim milk, in the same manner, a suitable quantity of a rich cream containing, say, 20% or upwards of butter-fat, to secure the desired proportion of butter-fat in the final product.

I prefer to maintain the cultured skim milk in the container 5 at a temperature below 60° F. and preferably about 50° F. during the introduction and dispersion of the butter-fat material.

It will furthermore be readily apparent that the introduction of the butter-fat material into the cultured skim milk may be effected when the latter is in continuous flow through the pipe or conduit, the butter-fat material being introduced into the flowing cultured skim milk by a suitable spray device continuously in a mass proportioned to secure the desired percentage of butter-fat in the final product.

By operating in accordance with the present invention, I secure a product in which the butter-fat is uniformly dispersed in a fine flaky condition imparting a highly agreeable flavor and richness thereto.

When employing *Streptococcus lactis* as the bacteria-producing organism, I may introduce the butter-fat material in the manner described before or during the propagation of the bacteria, since the propagation is conducted at a temperature of about 70° F. When using other bacteria requiring propagation at higher temperatures, such as the bulgaricus and acidophilus organisms, I prefer to introduce the butter-fat material subsequent to the development of the lactic acid and after cooling to the temperature as hereinbefore set forth.

I claim:

1. The method of producing a butter-fat and lactic acid containing milk product which comprises injecting finely atomized butter-fat material into lactic acid-cultured skim milk having an acidity of at least 0.5% (calculated as lactic acid) while maintaining the said skim milk at a temperature not higher than 75° F. to 80° F., and forcibly impelling an independent flow of the liquid continuously past the point of introduction of the butter-fat material.

2. The method of producing a butter-fat and lactic acid containing milk product which comprises injecting finely atomized butter-fat material into lactic acid-cultured skim milk having an acidity of at least 0.5% (calculated as lactic acid) while maintaining the said skim milk at a temperature of about 50° F., and forcibly impelling an independent flow of the liquid continuously past the point of introduction of the butter-fat material.

3. The method of producing a butter-fat and lactic acid containing milk product which comprises injecting a finely atomized butter-fat material into lactic acid-cultured skim milk having an acidity of at least 0.5% (calculated as lactic acid) in proportion to secure 0.5% to 2% butter-fat therein while maintaining the liquid at a temperature not above 75° F. to 80° F. and continuously and independently agitating the liquid in proximity to the point of introduction of the butter-fat material, thereby preventing agglomeration of butter-fat particles.

4. The method of producing a butter-fat and lactic acid containig milk product which comprises injecting a finely atomized butter-fat material into lactic acid-cultured skim milk having an acidity of at least 0.5% (calculated as lactic acid) in proportion to secure a 0.5% to 2% butter-fat therein while maintaining the liquid at a temperature of 50° F. and continuouslly and independently agitating the liquid in proximity to the point of introduction of the butter-fat material, thereby preventing agglomeration of butter-fat particles.

5. The method of producing a butter-fat and lactic acid containing milk product which comprises propagating a suitable lactic acid-forming organism in skim milk to develop an acidity of at least 0.5% therein, maintaining a body of the resulting product in a container at a temperature not above 75° F. to 80° F., injecting into the body of liquid in said container below the surface of said body a finely atomized spray of butter-fat in proportion to provide 0.5% to 2% butter-fat in the product and continuously agitating the liquid in the container to impel it in independent flow past the point of injection of the butter-fat and thereby prevent agglomeration of butter-fat particles.

6. The method of producing a butter-fat and lactic acid containing milk product which comprises propagating a suitable lactic acid-forming organism in skim milk to develop an acidity of at least 0.5% therein, cooling a body of the resulting product in a container to a temperature of about 50° F., injecting into the body of liquid in said container below the surface of said body a finely atomized spray of butter-fat in proportion to provide 0.5% to 2% butter-fat in the product and continuously agitating the liquid in the container to impel it in independent flow past the point of injection of the butter-fat and thereby prevent agglomeration of butter-fat particles.

7. The method of producing a butter-fat and lactic acid containing milk product which comprises propagating streptococcus lactis in a body of skim milk at a temperature of about 70° F. to develop lactic acid therein, and during the propagation of the organism, injecting into the liquid below its surface a finely atomized spray of butter-fat material to supply 0.5% to 2% butter-fat therein and forcibly impelling an independent flow of the liquid past the point of supply of the butter-fat material, thereby preventing agglomeration of butter-fat particles.

8. The method of producing a butter fat and lactic acid containing milk product which comprises injecting a finely atomized spray of butter-fat material into skim milk below the surface thereof while maintaining the skim milk at a temperature not above 75° F. to 80° F. and forcibly impelling an independent flow of the skim milk past the point of supply of the butter-fat material to prevent agglomeration of butter-fat particles, and propagating in the resulting liquid a lactic acid-producing organism at a temperature of about 70° F. to produce the desired proportion of lactic acid therein.

HERERT E. OTTING.